Aug. 22, 1961 J. L. JENSEN 2,997,657
TRANSISTOR STABILIZATION CIRCUIT
Filed Nov. 7, 1956
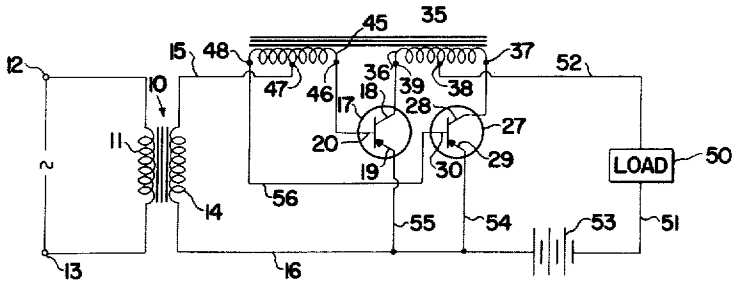
INVENTOR.
JAMES L. JENSEN
BY Warren A. Sturm
ATTORNEY

United States Patent Office 2,997,657
Patented Aug. 22, 1961

2,997,657

TRANSISTOR STABILIZATION CIRCUIT ames L. Jensen, St. Louis Park, Minn., assignor to Minneapolis-Honeywell Regulator Company, Minneapolis, Minn., a corporation of Delaware Filed Nov. 7, 1956, Ser. No. 620,900
2 Claims. (Cl. 330—30)

This invention relates generally to amplifiers. It is iore particularly directed to amplifiers wherein a pluility of parallel connected amplifying devices are to be perated in the condition wherein, for a given signal, ach of the amplifying devices contributes an equal mount of energy to the common output thereof.

This invention is particularly adapted for use in amlifiers wherein amplifying devices are used that are ıbject to saturation or destruction when the amount f energy flowing therethrough exceeds a predetermined alue. In the case of parallel connection of these ampliying devices it may be seen that the limiting factor in ıe total energy flowing due to the combined output of ıe amplifying devices is the sum total of the energy owing through each of the amplifying devices. It ıay readily be seen that if each of the amplifying devices operated at maximum safe capacity, maximum output ıay be obtained up to the safe limits of operation. In rder to prevent one of a number of parallel connected mplifying devices from exceeding its safe limits of opration it is therefore necessary, as I have provided in ıy invention, to provide a means for equal energy flow ırough each of the amplifying devices.

It is therefore an object of my invention to provide n amplifying means wherein a number of amplifying evices are connected in parallel and in which the energy ow through each of the amplifying devices is equal.

It is a further object of my invention to provide amlifying apparatus wherein a maximum output may be roduced from a plurality of parallel connected amplifyıg devices.

A still further object of my invention is to provide ansistor amplifying apparatus in which each of a pluility of transistor amplifiers, connected in parallel beveen a common load and a common signal source, are aused to provide a substantially equal portion of the ıtal output energy supplied to a common load.

Other objects and advantages of my invention will beome apparent from a consideration of the appended ecification, claims and drawings, in which The drawing shows a schematic representation of a rcuit embodying the principles of my invention.

In the drawing, I have shown a pair of transistors or ectric valves, 17 and 27, having their input circuits onnected in parallel to an input transformer 10, and their utput circuits connected in parallel to a load means 50. . second transformer means 35 is shown having a center ıpped primary winding 36 connected in the output cirıits of each of the transistors and a center tapped secndary winding 45 connected in the input circuits of ach of the transistors to provide a feedback signal for qualizing the output of the transistors.

Referring to the drawing, I have shown an input transrmer 10, having primary winding 11 and secondary inding 14 for supplying a signal to the input circuits of ansistors 17 and 27 as indicated below. Primary windıg 11 is connected to input terminals 12 and 13 which re shown as being energized by a source of alternating ırrent signal. Transformer 35 has a primary winding 36 aving terminals 37 and 39 and a center tap terminal 8 and a secondary winding 45 having terminals 46 and 8 and a center tap terminal 47. Transistors 17, having ollector electrode 18, emitter electrode 19, and base electrode 20, is shown connected with an input circuit including base electrode 20, terminal 46 on transformer secondary winding 45, the right side of secondary winding 45, center tap terminal 47, lead 15, transformer secondary winding 14, lead 16, lead 55 and emitter 19, and an output circuit including collector electrode 18, terminal 39 on secondary primary winding 36, the left side of primary winding 36, center tap terminal 38, lead 52, load 50, conductor 51, battery 53, lead 16, lead 55 and emitter 19. A second transistor 27, having collector electrode 28, emitter electrode 29, and base electrode 30, is connected in similar fashion with an input circuit including base electrode 30, lead 56, terminal 48 on secondary winding 45, the left side of secondary winding 45, center tap terminal 47, lead 15, secondary winding 14, lead 16, lead 54 and emitter 29, and an output circuit comprising collector electrode 28, terminal 37 on secondary winding 36, the right side of primary winding 36, center tap terminal 38, conductor 52, load 50, conductor 51, battery 53, conductor 16, conductor 54 and emitter electrode 29.

*Operation*

In the operation of my invention, it will be assumed that an alternating current signal is applied to terminals 12 and 13 of primary winding 11 on transformer 10. The signal appearing across secondary winding 14 on transformer 10 is applied to the base-emitter input circuits of transistors 17 and 27 thereby causing a current to flow in the output circuits of transistors or valves 17 and 27 which is dependent upon the signal applied to the transistors As shown on the drawing, the right and left sections of primary winding 36, of transformer 35, are connected in series with the output circuits of transistors 17 and 27 and are connected in opposition so that if the currents appearing in the output circuits of the two transistors are equal the induced magneto-motive force on the core of transformer 35 will be zero due to the opposing relationship of the forces set up by the current flow in primary winding 36. In this condition there will be no feedback to the input circuits of transistors 17 and 27 since the transistors are conducting currents in equal amounts.

However, since this operation is not easily obtainable, most generally one or the other of the two transistors will have an output current which is greater than the other. In this situation one of the magneto-motive forces set up due to the current flow through the primary winding of transformer 35 will predominate and a voltage will be induced in secondary winding 45. Assuming that the current flow through transistor 17 is greater than that through transistor 27, the resultant of the opposing magneto motive forces set up by the currents flowing through primary winding 36 will cause voltages to be induced in secondary winding 45 such that the polarity of the right end of secondary winding 45 will be positive with respect to the center tap 47 and the polarity of the center tap will be positive with respect to the left end of secondary winding 45. The induced voltages will cause currents to flow in the input circuits of transistors 17 and 27 such that the conduction of transistor 17 will be reduced and the conduction of transistor 27 will be increased. This causes the current output of the two transistors to tend to equalize and, since the output currents of the two transistors will be substantially equal, the resultant of the opposing magneto-motive forces, due to the currents flowing in primary winding 36, will be substantially zero and each transistor will provide substantially one half of the total current to the load.

It is seen then, that I have provided a circuit for the parallel operation of a plurality of amplifying devices, in this case transistors, wherein each of a number of parallel connected amplifying devices is connected so as to provide an equal proportion of the total current, or energy, supplied to a common load. While I have shown my invention as being peculiarly adapted to transistor devices, which may be destroyed upon reaching saturation, it may easily be seen that the principles of my invention are equally applicable to devices which may safely be operated in a saturated condition, for instance, vacuum tubes.

It is seen that my invention, while shown and described with a pair of amplifying devices, may easily be extended, for instance, to a circuit using three amplifying devices connected in parallel by using a transformer of the three-phase type for providing the current equalization feedback signals from the output to the input of the amplifying devices. It may further be extended to a greater number of amplifying devices by utilizing the proper type of transformer.

It should be noted that the transformer 35, shown in the drawing for purposes of explanation, is a means for comparing the individual outputs of a number of amplifying devices connected in parallel, and supplying a signal to the individual inputs of the amplifying devices to provide equal output of each amplifying device and as such is more aptly described as a means for comparing the individual outputs of a number of amplifying devices connected in parallel, and supplying a signal to the individual inputs of the amplifying devices to provide equal output of each amplifying device.

It will be understood that modifications may be made in the design and arrangement of the parts without departing from the spirit of the invention.

What is claimed is:

1. In combination, a pair of transistors each having input, output and control electrodes; a source of current; load means; means for connecting a source of signal in parallel to said control electrodes to simultaneously render said transistors conductive in response thereto; transformer means having first and second primary winding portions for producing opposite fluxes as a result of current flow through said primary windings, said first primary winding portion being connected in series with one of said output electrodes and said second primary winding portion being connected in series with the other of said output electrodes; junction means connecting the other end of said primary winding portions together; means for connecting said load means between said junction means and said source of current; and secondary winding means having at least two terminals in said transformer for producing an output in response to an unbalance in said opposing fluxes, said secondary winding terminals being connected in parallel to said control electrodes.

2. Amplifier apparatus for equalizing the currents flowing in paralleled semiconductor amplifier devices comprising: first and second semiconductor amplifying devices each having a plurality of electrodes including an output electrode, an input electrode, and a control electrode; transformer means having a primary winding and a feedback winding each winding having first and second end terminals and a centertap; load means; a source of potential having one terminal thereof connected to a point of fixed potential; means connecting said input electrodes of said devices in parallel to said point of fixed potential; a source of signal having a pair of terminals; means connecting one of said signal terminals to said point of fixed potential; means connecting the other signal source terminal to said feedback winding centertap; means connecting the first end terminal of said feedback winding to said first device control electrode and the second end terminal of said feedback winding to said second device control electrode thereby connecting said signal source in parallel to said control electrodes; means for connecting said load means between said primary winding centertap and the other terminal of said source of potential; and means connecting said first device output electrode to said first primary winding end terminal and said second device output electrode to said second primary winding end terminal for producing opposing fluxes as a result of the currents flowing through said primary winding from said first and second end terminals to said centertap, so that when unequal currents flow in said semiconductor devices to produce an unbalance in said opposing fluxes, an output is produced in said feedback winding to tend to equalize said currents.

References Cited in the file of this patent

UNITED STATES PATENTS

| | | |
|---|---|---|
| 2,605,333 | Job | July 29, 1952 |
| 2,666,819 | Raisbeck | Jan. 19, 1954 |
| 2,719,191 | Hermes | Sept. 27, 1955 |
| 2,821,674 | Hughes | Jan. 28, 1958 |
| 2,886,764 | Zelina | May 12, 1959 |

FOREIGN PATENTS

| | | |
|---|---|---|
| 170,603 | Austria | Mar. 10, 1952 |
| 180,081 | Austria | Nov. 10, 1954 |
| 156,629 | Sweden | Oct. 23, 1956 |